C. VAN HORN.
Planing Metal.
No. 15,538. Patented Aug. 12, 1856.
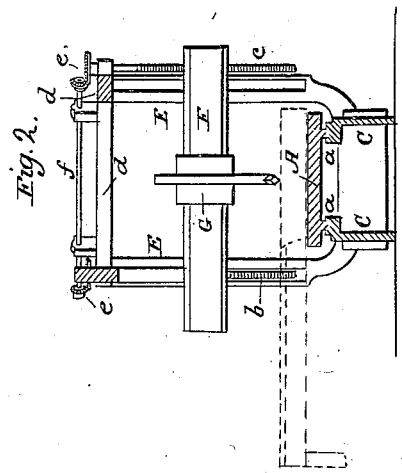
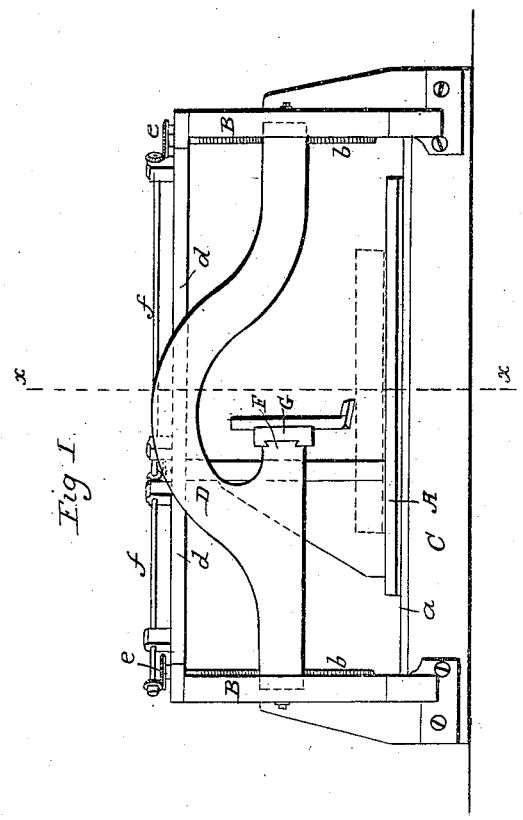

UNITED STATES PATENT OFFICE.

CHESTER VAN HORN, OF SPRINGFIELD, MASSACHUSETTS.

PLANING METAL.

Specification of Letters Patent No. 15,538, dated August 12, 1856.

*To all whom it may concern:*

Be it known that I, CHESTER VAN HORN, of Springfield, in the county of Hampden and State of Massachusetts, have invented a new and useful Improvement in Metal-Planers; and I do hereby declare that the following is a full, clear, and exact description of the same, reference being had to the annexed drawings, making a part of this specification, in which—

Figure 1, is a side view of my improvement, Fig. 2, is a transverse vertical section of ditto, $x$—$x$, Fig. 1, showing the plane of section.

Similar letters of reference indicate corresponding parts in the two figures.

My invention consists in the peculiar manner of supporting the cross head or cross slide on which the tool stock is fitted, whereby work of any width may be planed.

To enable those skilled in the art to make and use my invention, I will proceed to describe it.

A, represents the bed plate on which the work to be planed is placed, and $a$, $a$ are ways on which the bed plate A, is fitted and works said bed plate having a reciprocating motion and arranged and operated in the usual way.

B, B, represents two uprights which are placed one at each end of the framing C, on which the ways $a$, $a$, are placed, and D, is a beam, the ends of which are fitted in the uprights B, B, the uprights and beam being at one side of the framing C. The ends of the beam D, have vertical screw rods $b$, $b$, passing through them, said screw rods being fitted in the uprights B, which are slotted vertically, as clearly shown in Fig. 2, the ends of the beam D being allowed to slide freely up and down in the uprights B.

To the opposite side of the framing C, there is attached an upright E, which is also slotted vertically, and F is a cross slide or head, one end of which is secured to the beam D and the opposite end has a flanch or projection on one side which fits in the slotted upright E. A vertical screw rod $c$, passes through a nut attached to this end of the cross slide, the upper end of said screw rod passing through the ends of beams $d$, $d$, which are secured to the upper ends of the three uprights B, B, E. The upper ends of the three screw rods $b$, $b$, $c$, are connected by gearing $e$ and shafts $f$, so that the three screw rods may be rotated by turning one crank. The tool stock G, is fitted on the cross slide F, in the usual manner.

From the above description, it will be seen that one side of the machine is wholly unobstructed, in consequence of the uprights B, B, being at the ends of the framing C, and consequently, pieces of work much wider than the bed plate and framing may be planed, because the work may be planed between the uprights B, B.

In the usual planes, there are two uprights, one at each side of the bed and frame, and these uprights prevent, of course, the work being of greater width than the bed or the space between the uprights. In my improvement, one of these uprights only, E, is at one side of the bed, but two may be employed, if desired, with a beam fitted between them in the same way as the beam D at the opposite side.

Having thus described my invention, what I claim as new and desire to secure by Letters Patent, is—

Supporting the cross slide F, by means of uprights B, B, with the beam D, fitted between them at one side of the bed plate A and framing C, and having either one upright E, or two at the opposite side of the bed plate and framing substantially as described, for the purpose set forth.

CHESTER VAN HORN.

Witnesses:
F. CHAMBERLIN,
WM. H. L. BARNES.